United States Patent
Hope (10) Patent No.: US 10,762,307 B2
(45) Date of Patent: Sep. 1, 2020

(54) TERMINAL, CARGO TAG AND CARGO MANAGEMENT SYSTEM AND PROCESSING METHODS THEREOF

(71) Applicant: ARGOX INFORMATION CO., LTD., New Taipei (TW)

(72) Inventor: John Hope, New Taipei (TW)

(73) Assignee: ARGOX INFORMATION CO., LTD., New Taipei (TW)

( * ) Notice: Subject to any disclaimer, the term of this patent is extended or adjusted under 35 U.S.C. 154(b) by 0 days.

(21) Appl. No.: 16/383,649

(22) Filed: Apr. 14, 2019

(65) Prior Publication Data

US 2020/0034579 A1    Jan. 30, 2020

(30) Foreign Application Priority Data

Jul. 25, 2018    (TW) .............................. 107125699 A (51) Int. Cl.
| | | |
|---|---|---|
| *G08B 13/14* | (2006.01) | |
| *G06K 7/00* | (2006.01) | |
| *G08B 7/06* | (2006.01) | |
| *G08B 21/18* | (2006.01) | |

(52) U.S. Cl.
CPC ............. *G06K 7/0095* (2013.01); *G08B 7/06* (2013.01); *G08B 21/182* (2013.01)

(58) Field of Classification Search
CPC ....... G06K 7/0095; G08B 7/06; G08B 21/182
USPC ..................................................... 340/572.1
See application file for complete search history.

(56) References Cited

U.S. PATENT DOCUMENTS

| | | | | |
|---|---|---|---|---|
| 5,051,565 A | * | 9/1991 | Wolfram | B64F 1/366 235/375 |
| 5,565,858 A | * | 10/1996 | Guthrie | G01S 19/09 340/10.33 |
| 6,044,353 A | * | 3/2000 | Pugliese, III | G06Q 10/02 235/375 |
| 6,222,452 B1 | * | 4/2001 | Ahlstrom | G06Q 10/08 340/572.1 |
| 6,356,802 B1 | * | 3/2002 | Takehara | G06Q 10/08 235/385 |
| 7,922,085 B2 | * | 4/2011 | Thomas | B66C 13/46 235/384 |
| 9,761,104 B1 | * | 9/2017 | Gleason | G08B 3/10 |
| 10,477,600 B1 | * | 11/2019 | Willis | H04W 76/11 |
| 2003/0023469 A1 | * | 1/2003 | Lee | G06Q 10/08 705/13 |
| 2003/0215114 A1 | * | 11/2003 | Kyle | G06K 9/00973 382/115 |

(Continued)

FOREIGN PATENT DOCUMENTS

| | | |
|---|---|---|
| CN | 203930849 U | 11/2014 |
| CN | 206672552 U | 11/2017 |

*Primary Examiner* — Zhen Y Wu
(74) *Attorney, Agent, or Firm* — Anna Tsang (57) ABSTRACT

A terminal of a cargo management system is provided. The terminal comprises: a scanner for scanning an identity; a wireless interface for wireless connecting to a cargo tag; a memory; and a processing module, coupled to the scanner, the wireless interface and the memory, configured for executing instructions stored in the memory to implement following steps: scanning an ID shown on a cargo tag; scanning an identity corresponding to a cargo; and storing a pairing relationship of the ID of the cargo tag and the identity of the cargo in the memory.

4 Claims, 8 Drawing Sheets

(56) References Cited

U.S. PATENT DOCUMENTS

| | | | |
|---|---|---|---|
| 2004/0059953 A1* | 3/2004 | Purnell | G06F 21/34 726/6 |
| 2005/0029350 A1* | 2/2005 | Jusas | G06K 5/02 235/451 |
| 2005/0203683 A1* | 9/2005 | Olsen | G08B 21/0261 701/29.3 |
| 2005/0246132 A1* | 11/2005 | Olin | G06Q 10/08 702/174 |
| 2006/0006986 A1* | 1/2006 | Gravelle | G06K 7/10356 340/10.3 |
| 2007/0109128 A1* | 5/2007 | Fujii | G01S 13/74 340/572.1 |
| 2007/0200701 A1* | 8/2007 | English | G08B 13/2462 340/572.1 |
| 2007/0285236 A1* | 12/2007 | Batra | G06K 7/0008 340/572.1 |
| 2008/0252417 A1* | 10/2008 | Thomas | G06Q 10/08 340/10.1 |
| 2009/0201152 A1* | 8/2009 | Karr | G01S 15/876 340/545.6 |
| 2012/0293642 A1* | 11/2012 | Berini | G06F 21/602 348/77 |
| 2013/0015971 A1* | 1/2013 | Caporizzo | G08B 13/1427 340/539.32 |
| 2014/0191851 A1* | 7/2014 | Warther | G06K 19/077 340/10.6 |
| 2014/0197926 A1* | 7/2014 | Nikitin | G06K 7/10356 340/10.1 |
| 2014/0263677 A1* | 9/2014 | Divringi | G06Q 30/02 235/494 |
| 2015/0129666 A1* | 5/2015 | Butler | H04L 67/12 235/492 |
| 2016/0148440 A1* | 5/2016 | Kwak | G07C 5/085 701/31.5 |
| 2016/0189088 A1* | 6/2016 | Pecorari | G10L 17/22 705/337 |
| 2016/0210547 A1* | 7/2016 | Dekeyser | G06K 19/07758 |
| 2016/0227897 A1* | 8/2016 | Jobling | G09F 3/201 |
| 2016/0284185 A1* | 9/2016 | Maison | G06Q 10/0833 |
| 2016/0311509 A1* | 10/2016 | Buffa | B63B 39/12 |
| 2016/0328900 A1* | 11/2016 | Yong | H04W 4/023 |
| 2016/0379102 A1* | 12/2016 | Ferguson | G06Q 10/08 235/385 |
| 2017/0004384 A1* | 1/2017 | Audo | G06K 9/00 |
| 2017/0004444 A1* | 1/2017 | Krasko | G06Q 10/0833 |
| 2017/0091500 A1* | 3/2017 | Reh | A45C 13/42 |
| 2017/0362033 A1* | 12/2017 | Mahfouz | B64F 1/368 |
| 2017/0372105 A1* | 12/2017 | Coxall | G06Q 10/087 |
| 2017/0372262 A1* | 12/2017 | Haney | G06Q 10/0833 |
| 2018/0150794 A1* | 5/2018 | Ho | G06Q 10/0833 |
| 2018/0204030 A1* | 7/2018 | Bruce | G06Q 10/0833 |
| 2018/0253377 A1* | 9/2018 | Liang | G06F 12/0802 |
| 2019/0026514 A1* | 1/2019 | Shiraishi | G09C 3/208 |
| 2019/0114659 A1* | 4/2019 | Bellrose | G06Q 30/0235 |
| 2019/0138949 A1* | 5/2019 | Malinofsky | B64F 1/368 |

\* cited by examiner

TERMINAL, CARGO TAG AND CARGO MANAGEMENT SYSTEM AND PROCESSING METHODS THEREOF

CROSS REFERENCE TO RELATED APPLICATIONS

This application claims priority to U.S. provisional patent application, No. 62/679,040, filed on Jun. 1, 2018 and Taiwan patent application, No. 107125699, filed on Jul. 25, 2018, the disclosures of which are incorporated herein by reference.

BACKGROUND OF THE INVENTION

1. Field of the Invention

The present invention relates to warehouse management, and more particularly, to a light-weighted cargo management system which can be deployed quickly.

2. Description of the Prior Art

Expensive and massive warehouse management information systems (MIS) are usually employed to handle a large quantity of cargos in traditional warehouse management operations. In order to operate this kind of traditional warehouse MIS, servers are installed in the warehouse, electronic shelf labels are installed in every shelf, access terminals are carried by workers or transportation machines, and wireless networks are facilitated inside warehouses so as the aforementioned servers, electronic shelf labels, and access terminals can communicate with each other.

However, this kind of traditional warehouse MIS does not fit in many scenarios and is not applicable to medium or small-sized business. For examples, research and development department may order multiple types of raw materials or components; marketing department needs to buy multiple types of competing products; servicing department may receive multiple types of faulty products, each raw material, component and product with small quantities. The quantity of cargo may be as few as only one. Hence, different types of cargos may be packed together. If the cargos have to be stored in the warehouse, product numbers and serial numbers of these cargos are required to be input into the warehouse MIS in the traditional way. And it is a time consuming and labor intensive work. Moreover, these types of cargos may be received only once, users are reluctant to put them into the warehouse following regular process flow.

In the aforementioned scenario, users likely put these cargos into temporary storage without entering them into the warehouse MIS. The receivers have to look for their cargos in the temporary storage. It is also time-consuming and labor intensive. For example, modern franchised convenient stores provide a kind of service: receiver can retrieve cargos from one of the convenient stores. Although the MIS of the franchised convenient stores is able to manage information of whether the cargos are in each store and whether the cargos are retrieved or not, clerks of the convenient store would put the cargos in temporary storage when the cargos are delivered to the convenient store. However, the MIS does not know the positions of these cargos in the temporary storage. When the receivers come to retrieve their cargos, clerks have to search in the temporary storage. Since the convenient stores do not know when the receivers would come to retrieve cargos, the service quality cannot be controlled by the convenient stores.

Hence, it is desired to provide a light-weighted cargo management system which can be deployed quickly and allows user learns positions of cargo in a short period so as the time required for cargo retrieval is shortened and the service efficiency is improved.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

According to one embodiment of the present invention, a terminal of a cargo management system is provided. The terminal comprises: a scanner for scanning an identity; a wireless interface for wireless connecting to a cargo tag; a memory; and a processing module, coupled to the scanner, the wireless interface and the memory, configured for executing instructions stored in the memory to implement following steps: scanning an ID shown on a cargo tag; scanning an identity corresponding to a cargo; and storing a pairing relationship of the ID of the cargo tag and the identity of the cargo in the memory.

According to one embodiment of the present invention, a terminal of a cargo management system is provided. The terminal comprises: a wireless interface, configured for wirelessly connecting at least one cargo tag; a memory, configured for storing a plurality of pairing relationships, each of the pairing relationships comprises an identity of a cargo and an ID of a cargo tag; and a processing module, coupled to the wireless interface and the memory, configured for executing instructions stored in the memory to implement following steps: receiving an identity; finding a pairing relationship comprising the received identity among the plurality of pairing relationships; after the pairing relationship is found, transmitting a paging message to a cargo tag recorded in the pairing relationship; and after the transmitting the paging message, receiving a command to delete the pairing relationship in the memory.

According to one embodiment of the present invention, a cargo tag of a cargo management system is provided. The cargo tag comprises a memory; a wireless interface, configured for wirelessly connecting to a terminal; a speaker, configured for emitting audible signal; a visual indicator, configured for emitting visual signal; and a processing module, coupled to the memory, the wireless interface, the speaker and the visual indicator, configured for executing instructions stored in the memory to implement following steps: receiving a paging message from a terminal via the wireless interface; and during a time period after the paging message is received, having the speaker to emit a first audible signal and the visual indicator to emit a first visual signal to prompt a user.

According to one embodiment of the present invention, a cargo management system comprising the aforementioned cargo tag and the terminal is provided.

According to one embodiment of the present invention, a processing method of a terminal of a cargo management system is provided. The processing method comprises: scanning, by a scanner of the terminal, an ID shown on a cargo tag; scanning, by the scanner, an identity corresponding to a cargo; and storing a pairing relationship of the ID of the cargo tag and the identity of the cargo in a memory of the terminal.

According to an embodiment of the present invention, a processing method of a cargo management system is provided. The processing method comprises: receiving an identity by a terminal; finding a pairing relationship comprising the received identity among a plurality of pairing relationships stored in a memory of the terminal; after the pairing relationship is found, transmitting a paging message to a cargo tag recorded in the pairing relationship via a wireless interface of the terminal; and after the transmitting the paging message, receiving a command to delete the pairing relationship in the memory of the terminal.

The cargo management system provided by the present invention can be used to dynamically pair a cargo and a cargo tag without inputting cumbersome information such as product number and warehousing position and no deployed information infrastructure are required. Hence, the system can be deployed quickly. It helps a user learn where the cargo is in a short time period. Thus, the time required for cargo retrieval is shortened and the service efficiency is improved.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1:
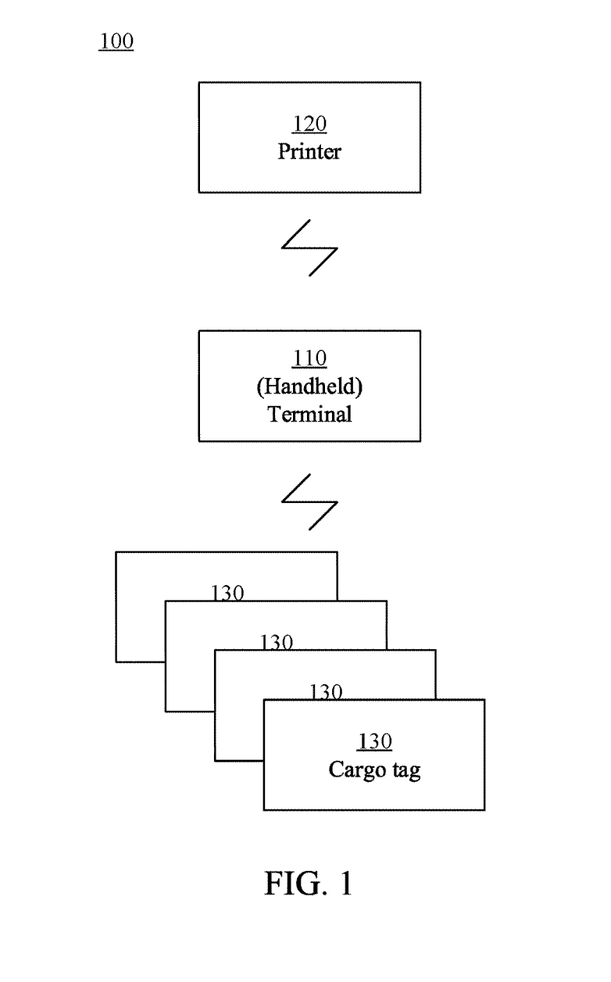
FIG. 1 is a block diagram depicts a cargo management system according to an embodiment of the present invention.

Please refer to FIG. 1, which shows a block diagram of a cargo management system 100 in accordance with an embodiment of the present invention. The cargo management system 100 comprises a terminal 110 used by a manager, a printer 120 and cargo tags 130. In one embodiment, the printer 120 constitutes a part of the terminal 110. In another embodiment, the printer 120 and the handheld terminal 110 are two separate devices which interconnect with each other via wired or wireless communication network such as Blue-tooth, Wireless Local Area Network (WLAN or WiFi) or wired LAN (Local Area Network).

Wireless communications are instituted between the terminal 110 and the cargo tags 130. In some embodiment, the cargo tag 130 has receiving function merely in order to decrease design difficulties and costs. In other embodiments, the terminal 110 and the cargo tag 130 are able to communicate with each other in bi-direction. In some embodiment, the wireless communication protocols are compatible with industrial standards. However, in order to save power consumption, variations of industrial communication standards or proprietary communication protocols may be utilized. The present invention does not constrain spectrum adapted to the wireless communication protocols. However, in one embodiment, the wireless communication uses ISM band (Industrial, Scientific and Medical band) without licensing.

In order to be sustained in industrial operating environment, the terminal 110 and the cargo tags 130 may be robust designed for dust-proof, water-proof and drop-proof. Their environmental and temperature specifications may satisfy industrial or military requirements. For user's convenience, the terminal 110 may be designed as a handheld device. The cargo tag 130 may comprise tether or any other mechanical apparatus for affixing cargo, such as plastic bag, tape, and etc.

The terminal 110 and/or the cargo tags 130 may use rechargeable batteries or replaceable disposable batteries. Although it is not shown, the terminal 110 and/or the cargo tags 130 may have charging and protection interface for charging the rechargeable batteries in the respective devices. They may have power detection modules for measuring output voltages of the batteries in order to estimate power remained in the batteries.

Figure 2:
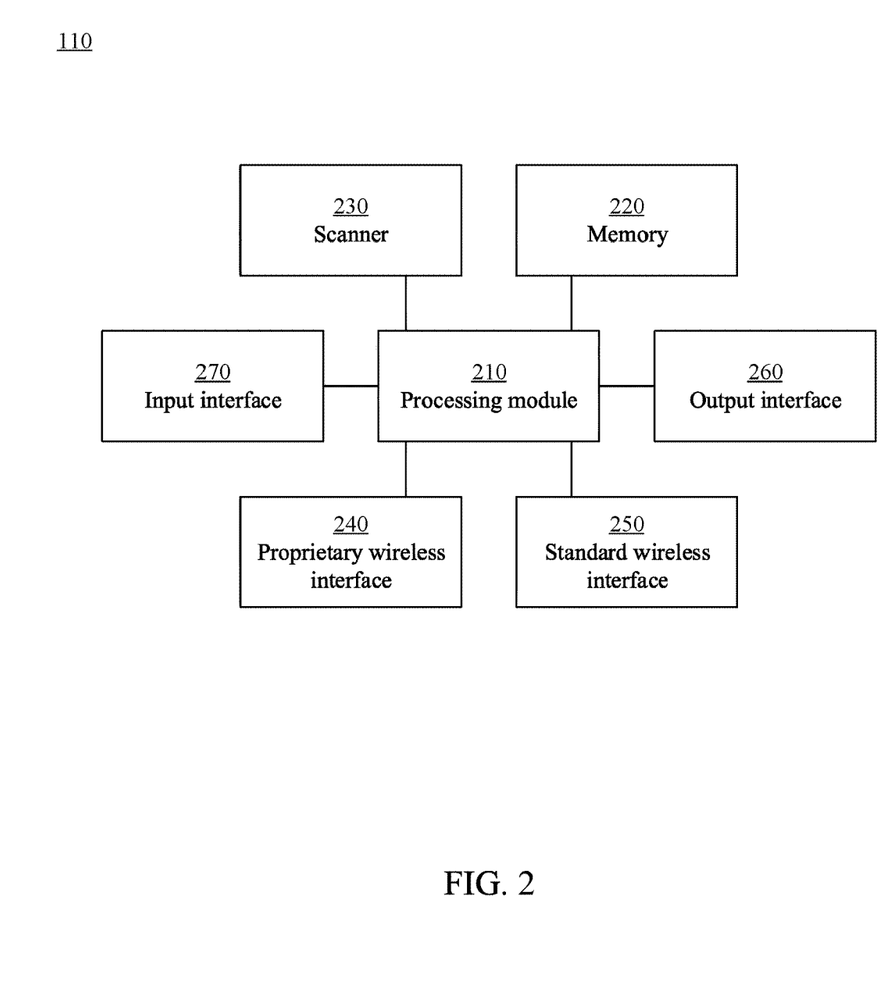
FIG. 2 is a block diagram shows a terminal according to an embodiment of the present invention.

Please refer to FIG. 2, which illustrates a block diagram of a terminal 110 in accordance with an embodiment of the present invention. The terminal 110 may comprise a processing module 210 and multiple modules or devices connected to the processing module 210. They may include a memory 220, a scanner 230, a proprietary wireless interface 240, a standard wireless interface 250, an output interface 260 and an input interface 270. The processing module 210 may include a processor which may be a normal independent processor or an embedded processor, such as Intel i960 series processor or ARM Cortex M series processor. The present invention does not constrain the form, architecture or instruction set of the processor. The processor comprises any kinds of interface for connecting the aforementioned modules or devices and it is configured to execute instructions stored in the memory 220 such as operating system and/or application programs for implementing methods provided by the present invention.

In addition storing non-volatile instructions to be executed by the processor, the memory 220 may store volatile or non-volatile data, e.g., a mapping table (to be described later), database or others. The scanner 230 may be a barcode scanner, a QR code scanner or a camera lens for reading barcode, QR code or any machine and/or human readable codes such as alphabets and numbers. The barcode and QR code are widely used in the markings of objects. Cost of a barcode scanner is usually lower than a QR code scanner and cost of a QR code scanner is usually lower than any other machine readable code scanner.

The proprietary wireless interface 240 is configured for providing wireless connections to the cargo tags 130 by using the aforementioned proprietary wireless communication protocol. The standard wireless interface 250 is configured for providing wireless connections to the printer 120 by using wireless communication protocol compatible with the aforementioned industrial standards. However, the present application does not require using proprietary or standard communication protocols to connect the cargo tags 130 or the printer 120. The terminal 110 may use the standard wireless interface 250 to connect to other systems such as the warehouse MIS, EMAIL system or other internal business management systems by the standard wireless communication protocol.

The output interface 260 such as display and speaker is configured for promoting user to proceed to a next step. In addition, the terminal 110 may comprise the input interface 270 such as physical keyboard, mouse, touch sensitive display or stylus for receiving user's inputs.

Figure 3:
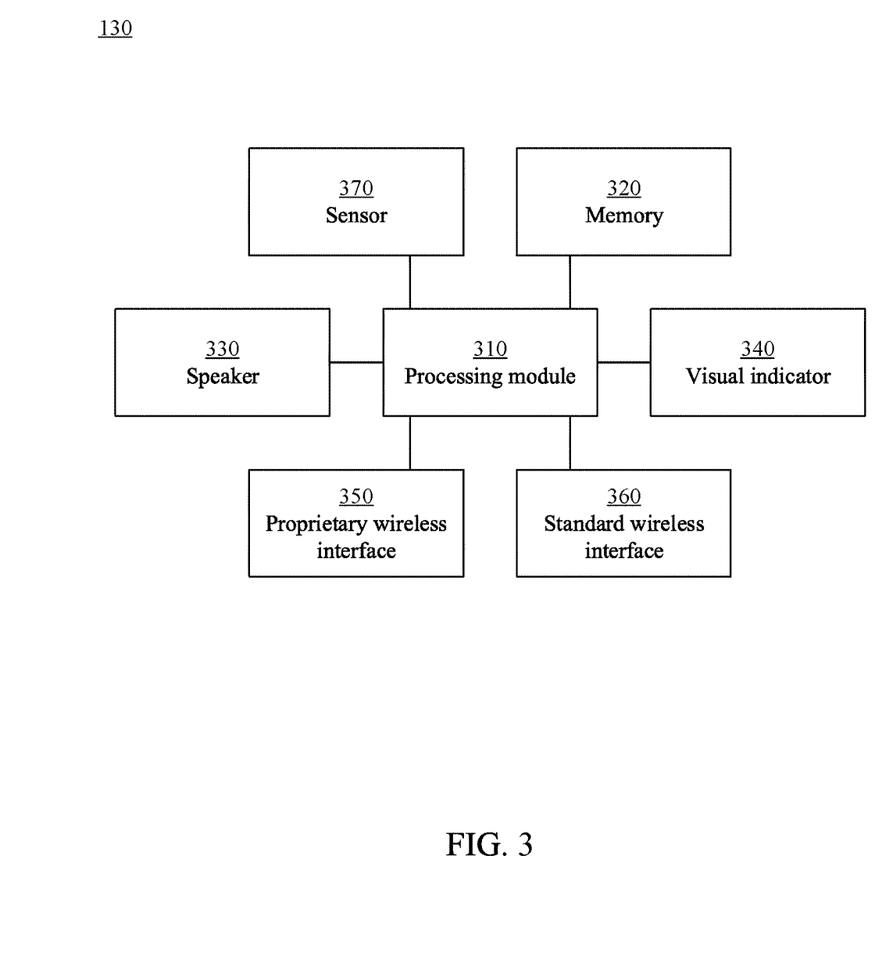
FIG. 3 is a block diagram illustrates a cargo tag according to an embodiment of the present invention.

Please refer to FIG. 3, which depicts a block diagram of a cargo tag 130 in accordance with an embodiment of the present invention. The cargo tag 130 may comprise a processing module 310 and multiple modules or devices connected to the processing module 310. They may include a memory 320, a speaker 330, a visual indicator 340, a proprietary wireless interface 350, a standard wireless interface 360, and at least one sensor 370. The processing module 310 may include a processor which may be a normal independent processor or an embedded processor, such as Intel i960 series processor or ARM Cortex M series processor. The present invention does not constrain the form, architecture or instruction set of the processor. The processor comprises any kinds of interface for connecting the aforementioned modules or devices and it is configured to execute instructions stored in the memory 320 such as operating system and/or application programs for implementing methods provided by the present invention.

In addition to store non-volatile instructions to be executed by the processor, the memory 320 may store volatile or non-volatile data. In one embodiment, the memory 320 stores a non-volatile ID (IDentity) and/or a dedicated addressing code. The ID or the dedicated addressing code is a unique code for identifying the cargo tag 130 in the cargo management system 100. In one example, the ID and the dedicated addressing code are different. But they can be 1-on-1 converted or mapped. A mapping table or a conversion formula may be used to convert the ID or the dedicated addressing code. Generally, the dedicated addressing code is used to represent a device in a network and the ID is easier for user to identify the device. In the present invention, the ID and the dedicated addressing code are interoperable or interchangeable. In an example, the ID is identical to the dedicated addressing code. They are the same. For example, the ID may be a string composed of alphabets or numbers. For convenience, the ID may be a number which can be presented as a bar code. In another embodiment, the ID may be a string which can be represented by a QR code or any other machine or human readable symbols. The ID can be set before the cargo tag 130 is shipped out of its manufacture or when the cargo tag 130 is deployed. The machine or human readable symbols corresponding to the ID may be appeared on a surface of the cargo tag 130 in order to be scanned by the scanner 230 of the terminal 110. It is noted that the machine or human readable symbols (the ID) may not be identical to the dedicated addressing code. However, the conversion between them can be done by using a mapping table or conversion formula.

The speaker 330 may be a horn or a more power-saving buzzer. It is configured for transmitting audible sounds to user who searches for the cargo tag 130. The visual indicator 340 may be a light bulb or a more power-saving LED (light-emitting diode). It is configured for transmitting lights or flashing signals to user who searches for the cargo tag 130.

The proprietary wireless interface 350 is configured for providing wireless connection to the terminal 110 by using the proprietary wireless communication protocol. The cargo tag 130 may use standard wireless communication protocol via the standard wireless interface 360 to connect to other systems, such as the aforementioned warehouse MIS, EMAIL system or any other business internal management systems.

The sensor 370 is configured for sensing at least one environmental parameter interior or exterior to the cargo tag 130. For example, described already, remained battery power of the cargo tag 130 can be sensed. Besides, in one embodiment, the sensor 370 may be used to sense environmental temperature or humidity. In case the cargo such as vaccine or food ties to the cargo tags 130 required being stored continuously in a low-temperature environment, the sensor 370 is able to sense environmental temperature surrounding the cargo and reporting the temperature readings to the terminal 110 or another system periodically. If the temperature is too hot, user can be informed. In another example, in case the cargo is fragile or sensitive to vibrations, the sensor 370 may be an accelerometer or a gyro. If the acceleration sensed by the sensor 370 is too much, user can be informed. In another example, in order to prevent destructive storage, the sensor 370 may be a pressure sensor. If the pressure sensed by the sensor 370 is too much, it may implies that the cargo is crushed under heavy pressure. Thus, user can be informed to inspect the cargo. The sensing results can be stored in the memory 320 and can be reviewed or inspected when the cargo is being retrieved. If any of the recorded values is higher than a threshold, it may remind user to return the cargo or to initiate corresponding insurance procedure.

Figure 4:
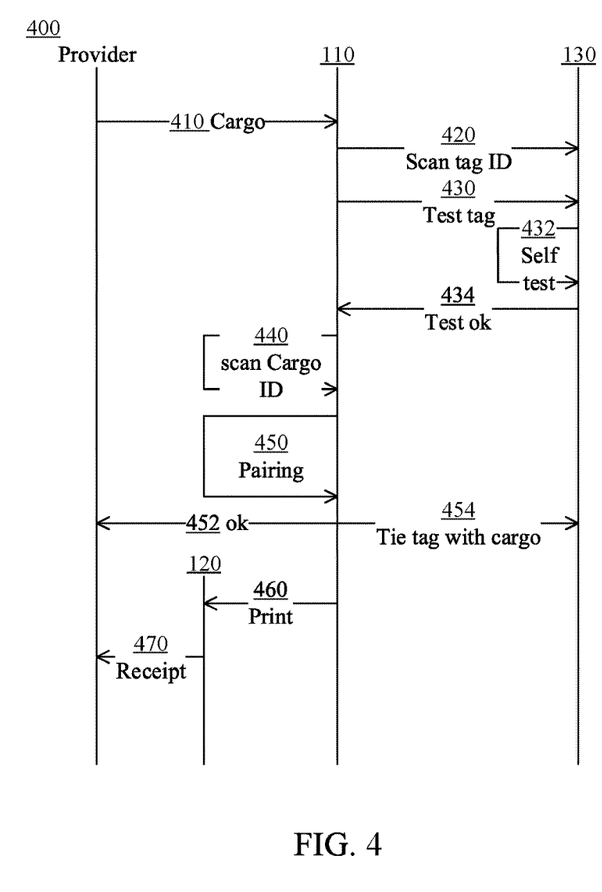
FIG. 4 is a timing sequence diagram reveals a cargo receiving scenario according to an embodiment of the present invention.

Please refer to FIG. 4 which shows a timing sequence diagram of a cargo receiving scenario 400 in accordance with an embodiment of the present invention. There are four roles in this scenario 400. In addition to the terminal 110, the printer 120 and the cargo tag 130 as shown in FIG. 1, a provider who provides cargo is further included. This scenario 400 includes multiple actions or steps. If no relationships between any two actions or steps, they may be done in any order other than those shown in FIG. 4.

First, in Step 410, the provider delivers the cargo to a manager of the terminal 110. A machine and/or human readable code for identifying the cargo is printed on a corresponding manifest or appears on a surface of the cargo. Next, in Step 420, The manager of the terminal 110 picks up a cargo tag 130 and read the ID of the cargo tag 130 by the scanner 230. In one example, the ID can be converted into a dedicated addressing code.

Once the ID and/or the dedicated addressing code is read, the terminal 110 may transmit a test signal to the cargo tag 130 via the proprietary wireless interface 240. Because the test signal contains the ID or the dedicated addressing code of the pick cargo tag 130, the test signal is dedicated to the pick cargo tag 130, other cargo tags 130 ignore the test signal.

When receiving the test signal in Step 432, the cargo tag 130 may perform one or any combinations of the following tests: whether the battery power is sufficient, whether the sensor 370 works normally, making the speaker 330 and/or the visual indicator 340 transmitting audible and visual signals, whether the standard wireless interface 250 connects to another system, and whether the proprietary wireless interface 240 connects to the terminal 110.

When one or more of the test steps are completed, in Step 434 the cargo tag 130 may inform the terminal regarding the tests are successful via the proprietary wireless interface 240. In one embodiment, in case the cargo tag 130 is lack of the proprietary wireless interface 350, the manager may determine whether the self-tests are successful or not according to the audible and/or visual signals emitted by the speaker 330 and/or the visual indicator 340.

Assuming the self-tests of the cargo tag 130 are successful, the flow goes to Step 440. The manager of the terminal 110 uses the scanner 230 to read the machine and/or human readable codes shown on the cargo surface or corresponding manifest. This particular Step 440 may be performed prior to the Step 420 for reading the ID and/or the dedicated addressing code of the cargo tag 130.

If the readings of the identity of the cargo and the ID and/or the dedicated addressing code corresponding to the cargo tag 130 are executed successfully, the flow goes to Step 450. The processing module 210 of the terminal 110 performs a pairing of the identity of the cargo and the ID of the cargo tag 130 and stores the pairing relationship in the memory 130. The pairing relationship may include other parameters such as time, information relevant to the manager and the provider. In order to prevent loss of pairing relationship due to power loss, it can be stored in non-volatile memory or backed up to other internal or external memory.

After the pairing relationship is stored, in Step 452 the manager of the terminal 110 informs the provider that the receiving procedure is done and the cargo tag 130 is affixed to the corresponding cargo by the tether or the mechanical apparatus in Step 454. After that, the paired cargo and cargo tag are put into storage by the manager.

In an optional Step 460, the terminal 110 may print the identity of the cargo and/or the ID of the cargo tag 130 via the printer 120 as a receipt. Next, in Step 470, the receipt is handed over to the provider.

Figure 5:
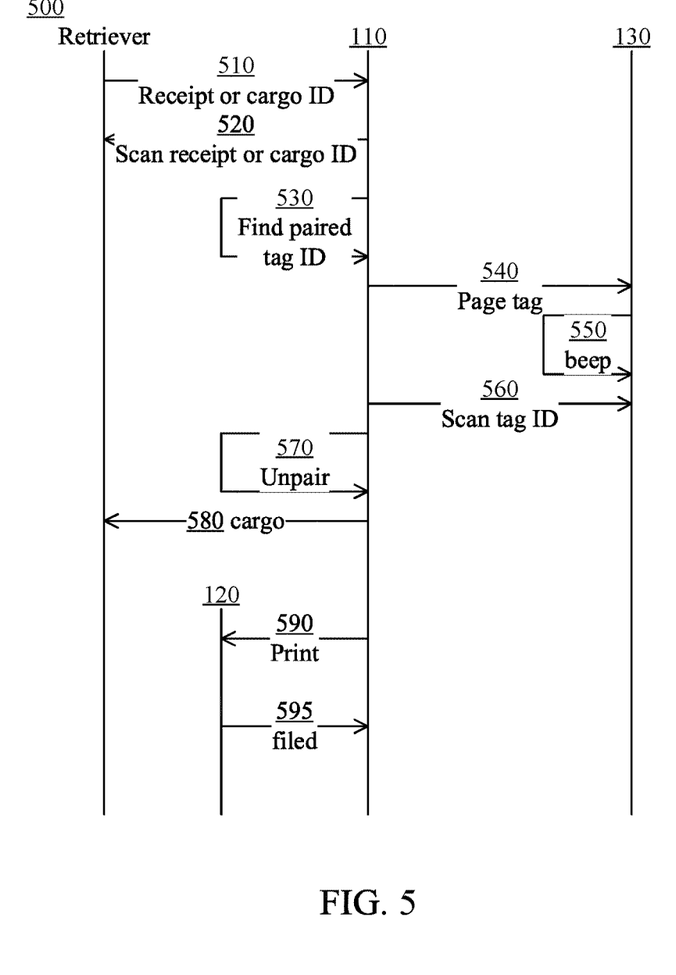
FIG. 5 is a timing sequence diagram depicts a cargo retrieval scenario according to an embodiment of the present invention.

Please refer to FIG. 5, which depicts a timing sequence diagram of a cargo retrieval scenario 500 in accordance with an embodiment of the present invention. There are four roles in the scenario 500. In additional to the terminal 110, the printer 120 and the cargo tag 130 as shown in FIG. 1, a retriever who retrieves cargo is further included. This scenario 500 includes multiple actions or steps. If no relationships between any two actions or steps, they may be done in any order other than those shown in FIG. 5.

First, in Step 510, the retriever may prompt the receipt, the identity of the cargo, or the ID of the cargo tag 130 to the manager of the terminal 110. The manager uses the scanner 230 to read the identity of the cargo or the ID of the cargo tag 130 in Step 520.

In case what the scanner 230 reads is the identity of the cargo, in Step 530, the processing module 210 of the terminal 110 reads the ID/dedicated addressing code of the corresponding cargo tag 130 out of the pairing relationship stored in the memory 220.

After reading the ID/dedicated addressing code of the corresponding cargo tag 130, the terminal 110 pages the corresponding cargo tag 130 via the proprietary wireless interface 240 in Step 540.

After receiving the paging signal, in Step 550, the cargo tag 130 can use the speaker 330 and/or the visual indicator 340 to emit audible and/or visual signals such that the manager can quickly finds the cargo tag 130 and its paired cargo in the storage.

Next, in Step 560, the manager can scan the machine or human readable symbols as the ID on the surface of the cargo tag 130 again. Thus, the terminal 110 stops paging so as the cargo tag 130 stop emitting audible and/or visual signals by the speaker 330 and/or the visual indicator 340. The step for stop paging may be triggered by pushing a button which belongs to a part of the input interface 270.

After the cargo tag 130 is found, in Step 570, the processing module 210 of the terminal 110 decouples and deletes the pairing relationship stored in the memory 220. The manager can separate the cargo tag 130 and the cargo and deliver the cargo to the retriever.

In an optional Step 590, the terminal 110 may print the identity corresponding to the cargo via the printer 120 as a retrieval receipt. In Step 595, the retriever may sign on the retrieval receipt which may be further docketed into a file.

Since there are many cargo tags 130, in any given time, one tag 130 may run out of battery power. Hence, in one embodiment, the terminal 110 may broadcast a test signal to all of the cargo tags 130 for measuring battery power. If the sensor 370 of a cargo tag 130 found that its remained power is too low, the cargo tag 130 may instruct the speaker 330 and/or the visual indicator 340 to transmit audible and/or visual signals so as the manager can charge or replace its battery.

Figure 6:
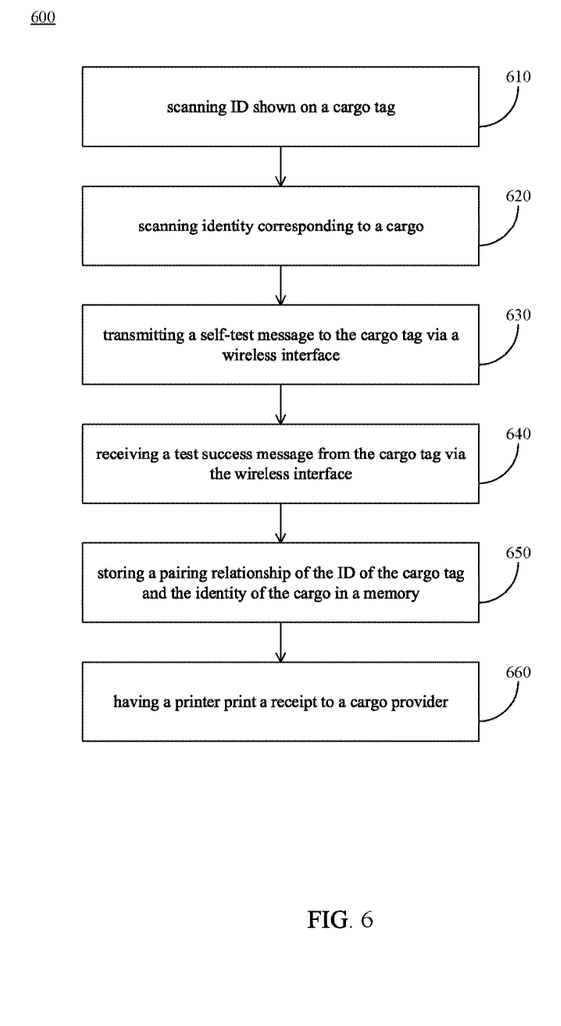
FIG. 6 is a flowchart diagram depicts a processing method performed by a terminal of a cargo management system according to an embodiment of the present invention.

Please refer to FIG. 6, which is a flowchart diagram depicts a processing method performed by a terminal of a cargo management system according to an embodiment of the present invention. The flow may be adapted to the terminal 110 as shown in FIGS. 1 and 2, especially adapted to the processing module 210. If no relationships between any two actions or steps recited in the flow 600, they may be done in any order.

Step 610: scanning ID shown on a cargo tag. As described above, the ID shown on the cargo tag may be human and/or machine readable code such as barcode or QR code. After the ID is read, it may be converted to a dedicated addressing code of the cargo tag according to a conversion rule. Both the ID and the dedicated addressing code can be uniquely used to identify the cargo tag.

Step 620: scanning identity corresponding to a cargo. The identity is usually printed on the cargo itself, a package of the cargo, or a manifest. The identity may be human and/or machine readable code such as barcode or QR code. Execution sequence of Steps 610 and 620 are interchangeable. After the Step 610 is performed, the flow may go to optional Steps 630 and 640 or go to Step 650.

Optional Step 630: transmitting a self-test message to the cargo tag via a wireless interface. The command may be transmitted directly to the cargo tag, without being routed via a wireless network. The self-test message contains the ID and/or the dedicated addressing code of the cargo tag. Thus, other cargo tags ignore the self-test message.

Optional Step 640: after Step 630 is performed, receiving a test success message from the cargo tag via the wireless interface. Next, the flow goes to Step 650. If no test success message is received after a certain time period or a test fail message is received, the flow 600 may ends or restarts from the beginning.

Step 650: storing a pairing relationship of the ID of the cargo tag and the identity of the cargo in a memory. After the storing is completed, a message may be presented to prompt user via an output interface.

Optional Step 660: having a printer print a receipt to a cargo provider. The ID of the cargo tag and/or the identity of the cargo may be printed on the receipt.

Figure 7:
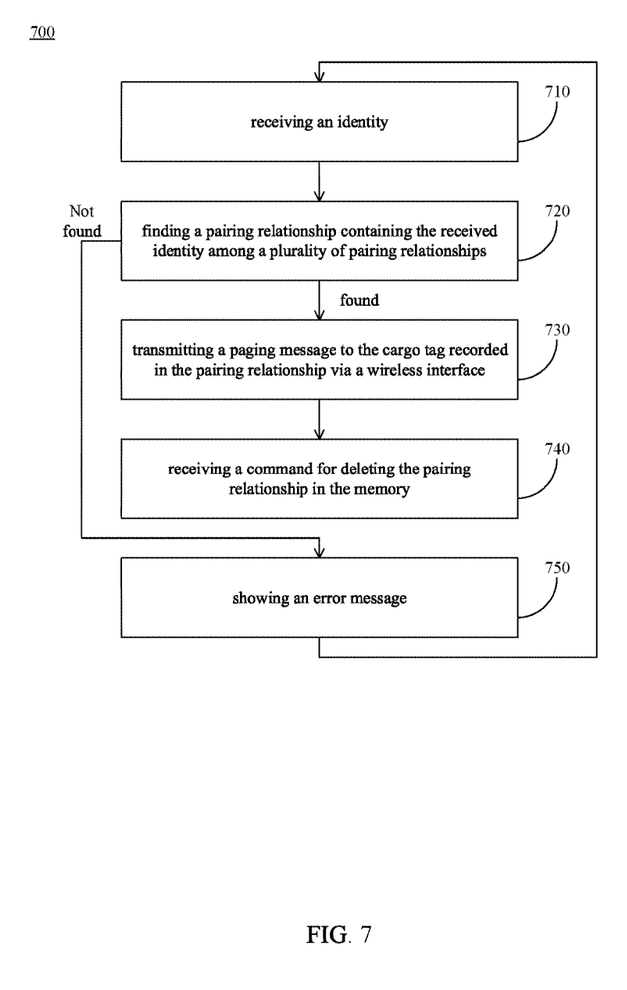
FIG. 7 is another flowchart diagram depicts a processing method performed by a terminal of a cargo management system according to an embodiment of the present invention.

Please refer to FIG. 7, which is a flowchart diagram depicts a processing method performed by a terminal of a cargo management system according to an embodiment of the present invention. The flow may be adapted to the terminal 110 as shown in FIGS. 1 and 2, especially adapted to the processing module 210. If no relationships between any two actions or steps recited in the flow 700, they may be done in any order.

Step 710: receiving an identity. The identity shown on a receipt may be scanned by a scanner. Alternatively, the identity may be inputted by an input interface such as keyboard and/or mouse. The received identity may be an identity of a cargo or an ID of a cargo tag.

Step 720: finding a pairing relationship containing the received identity among a plurality of pairing relationships stored in a memory. Each pairing relationship comprises an identity of a cargo and an ID of a cargo tag. No matter which kind of the received identity inputted in Step 710 is, a pairing relationship may be found. Once it is found, the flow goes to Step 730. Otherwise, the flow may go to optional Step 750.

Step 730: transmitting a paging message to the cargo tag recorded in the pairing relationship via a wireless interface. As described above, the paging message may comprise the ID and/or a dedicated addressing code of the cargo tag. Thus other cargo tags ignore the paging message. The Step 730 may be repeatedly executed.

Step 740: receiving a command for deleting the pairing relationship in the memory. The command may be a scan of an identity of the cargo by a scanner or an instruction inputted via keyboard and/or mouse by a user.

Optional Step 750: showing an error message.

Figure 8:
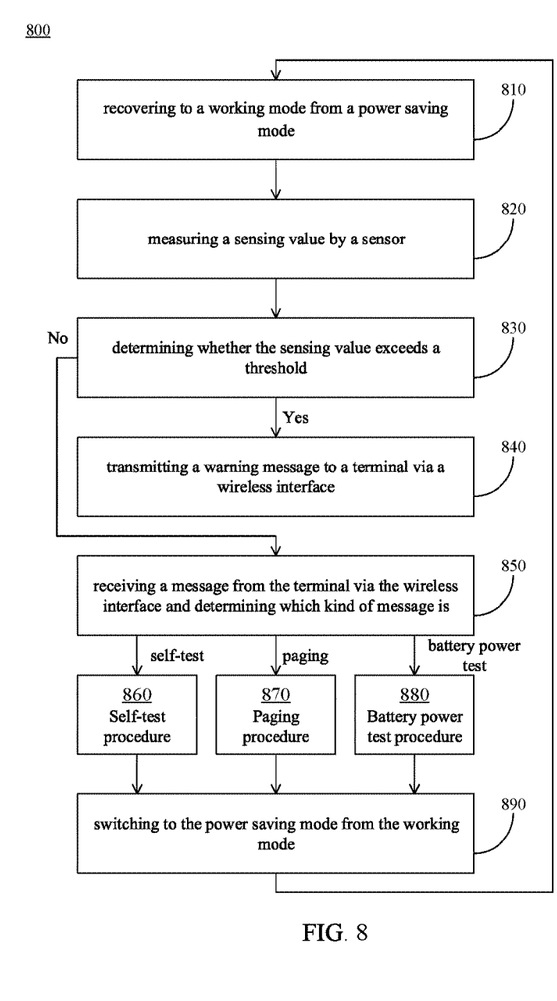
FIG. 8 is a flowchart diagram depicts a processing method performed by a cargo tag of a cargo management system according to an embodiment of the present invention.

Please refer to FIG. 8, which is a flowchart diagram depicts a processing method performed by a terminal of a cargo management system according to an embodiment of the present invention. The flow may be adapted to the cargo tag 130 as shown in FIGS. 1 and 3, especially adapted to the processing module 310. If no relationships between any two actions or steps recited in the flow 800, they may be done in any order.

Optional Step 810: recovering to a working mode from a power saving mode. Power consumption in the working mode is more than that in the power saving mode. The cargo tag may be configured in the power saving mode for a while and be awaken and switched to the working mode. Next, the flow may go to Step 820 or directly go to Step 850.

Optional Step 820: measuring a sensing value by a sensor. The sensing value may be stored in a memory.

Optional Step 830: determining whether the sensing value exceeds a threshold. If so, the flow 800 goes to Step 840. Otherwise, the flow 800 goes to Step 850.

Optional Step 840: transmitting a warning message to a terminal via a wireless interface. The warning message may comprise the sensing value exceeding the threshold.

Step 850: receiving a message from the terminal via the wireless interface and determining which kind of message is. If the received message is a self-test message, the flow goes to Step 860. If the received message is a paging message, the flow goes to Step 870. If the received message is a battery power test message, the flow goes to Step 880.

Step 860: performing a self-test procedure. The self-test procedure may be implemented as a flow 900 shown in FIG. 9. Next, the flow may go to Step 890.

Step 870: performing a paging procedure. The paging procedure may be implemented as a flow 1000 shown in FIG. 10. Next, the flow may go to Step 890.

Figure 11:
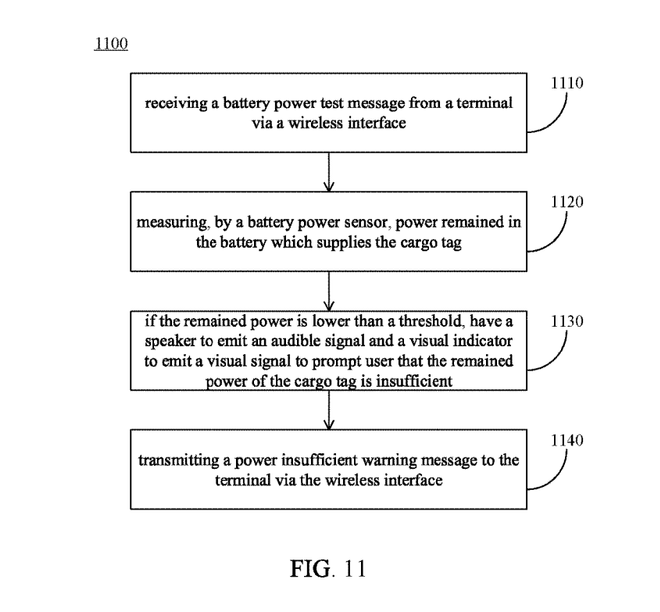
FIG. 11 is a flowchart diagram depicts a processing method performed by a cargo tag of a cargo management system according to an embodiment of the present invention.

Step 880: performing a battery power test procedure. The battery power test procedure may be implemented as a flow 1100 as shown in FIG. 11. Next, the flow may go to Step 890.

Optional Step 890: switching to the power saving mode from the working mode. After a time period is passed, the flow 800 restarts from the beginning.

Figure 9:
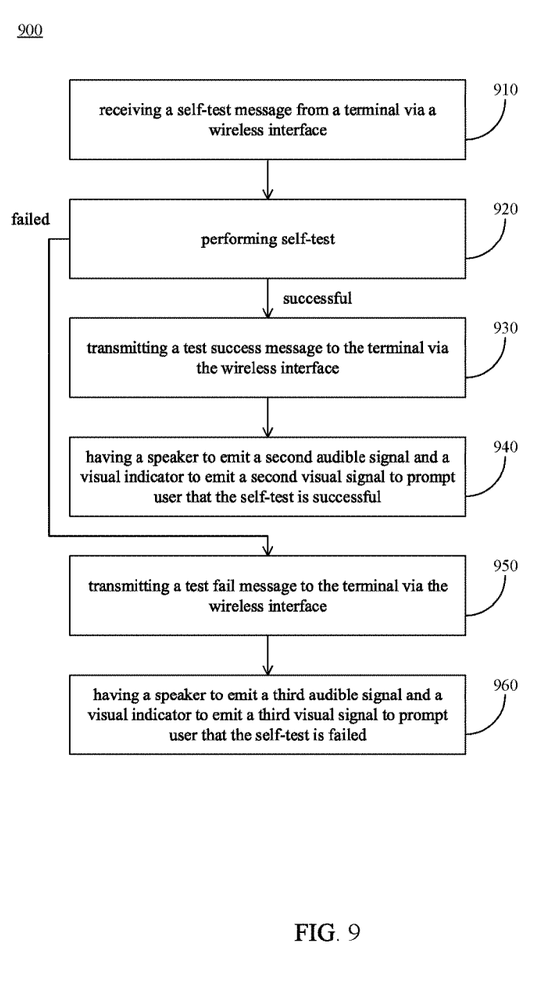
FIG. 9 is a flowchart diagram depicts a processing method performed by a cargo tag of a cargo management system according to an embodiment of the present invention.

Please refer to FIG. 9, which is a flowchart diagram depicts a processing method performed by a terminal of a cargo management system according to an embodiment of the present invention. The flow may be adapted to the cargo tag 130 as shown in FIGS. 1 and 3, especially adapted to the processing module 310. If no relationships between any two actions or steps recited in the flow 900, they may be done in any order.

Step 910: receiving a self-test message from a terminal via a wireless interface.

Step 920: performing self-test. If the test result is successful, the flow goes to Step 930. Otherwise, the flow goes to Step 950.

Step 930: transmitting a test success message to the terminal via the wireless interface.

Optional Step 940: having a speaker to emit a second audible signal and a visual indicator to emit a second visual signal to prompt user that the self-test is successful.

Step 950: transmitting a test fail message to the terminal via the wireless interface.

Optional Step 960: having a speaker to emit a third audible signal and a visual indicator to emit a third visual signal to prompt user that the self-test is failed.

During the self-test, failures of the wireless interface, the sensor, the speaker or the visual indicator may be tested faulty; the steps 950 and 960 may not be performed completely.

Figure 10:
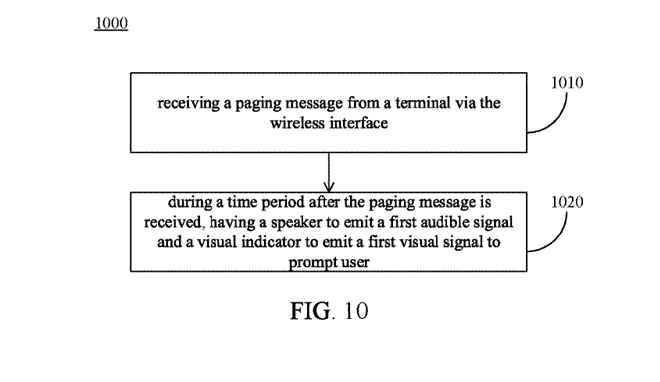
FIG. 10 is a flowchart diagram depicts a processing method performed by a cargo tag of a cargo management system according to an embodiment of the present invention.

Please refer to FIG. 10, which is a flowchart diagram depicts a processing method performed by a terminal of a cargo management system according to an embodiment of the present invention. The flow may be adapted to the cargo tag 130 as shown in FIGS. 1 and 3, especially adapted to the processing module 310. If no relationships between any two actions or steps recited in the flow 1000, they may be done in any order.

Step 1010: receiving a paging message from a terminal via the wireless interface.

Step 1020: during a time period after the paging message is received, having a speaker to emit a first audible signal and a visual indicator to emit a first visual signal to prompt user.

Please refer to FIG. 11, which is a flowchart diagram depicts a processing method performed by a terminal of a cargo management system according to an embodiment of the present invention. The flow may be adapted to the cargo tag 130 as shown in FIGS. 1 and 3, especially adapted to the processing module 310. If no relationships between any two actions or steps recited in the flow 1100, they may be done in any order.

Step 1110: receiving a battery power test message from a terminal via a wireless interface.

Step 1120: measuring, by a battery power sensor, power remained in the battery which supplies the cargo tag.

Step 1130: If the remained power is lower than a threshold, have a speaker to emit an audible signal and a visual indicator to emit a visual signal to prompt user that the remained power of the cargo tag is insufficient.

Optional Step 1140: transmitting a power insufficient warning message to the terminal via the wireless interface.

According to one embodiment of the present invention, a terminal of a cargo management system is provided. The terminal comprises: a scanner for scanning an identity; a wireless interface for wireless connecting to a cargo tag; a memory; and a processing module, coupled to the scanner, the wireless interface and the memory, configured for executing instructions stored in the memory to implement following steps: scanning an ID shown on a cargo tag; scanning an identity corresponding to a cargo; and storing a pairing relationship of the ID of the cargo tag and the identity of the cargo in the memory.

In the embodiment, in order to provide receipt to cargo provider, the processing module is further configured for: having a printer to print a receipt after the storing step, the receipt shows at least one of followings: the ID of the cargo tag; and the identity of the cargo. In one example, in order to let user moves around, the terminal further comprises a standard wireless interface for connecting to the printer. In another example, in order to prevent failure of the standard wireless interface, the terminal comprises the printer.

In the embodiment, in order to provide health cargo tag, the processing module is further configured for transmitting a self-test message to the cargo tag after scanning the ID shown on the cargo tag; and the storing step is performed in response to receiving a test success message from the cargo tag via the wireless interface.

In the embodiment, in order to discover cargo tags with insufficient battery power, the processing module is further configured for: broadcasting a battery power test message to all cargo tags via the wireless interface. The cargo tags receives the battery power test message would perform battery power measurement. If there is insufficient battery power, the cargo tag would have a speaker to emit an audible signal and a visual indicator to emit a visual signal to prompt a user that the cargo tag has insufficient battery power.

According to one embodiment of the present invention, a terminal of a cargo management system is provided. The terminal comprises: a wireless interface, configured for wirelessly connecting at least one cargo tag; a memory, configured for storing a plurality of pairing relationships, each of the pairing relationships comprises an identity of a cargo and an ID of a cargo tag; and a processing module, coupled to the wireless interface and the memory, configured for executing instructions stored in the memory to implement following steps: receiving an identity; finding a pairing relationship comprising the received identity among the plurality of pairing relationships; after the pairing relationship is found, transmitting a paging message to a cargo tag recorded in the pairing relationship; and after the transmitting the paging message, receiving a command to delete the pairing relationship in the memory.

In the embodiment, in order to provide convenience to user who retrieves cargo, the terminal further comprises a scanner for scanning the identity, wherein the identity comprises one of followings: an ID of the cargo tag; and an identity of a cargo.

In the embodiment, in order to provide convenience to delete the pairing relationship, the terminal further comprises a scanner, wherein the command is a scan of the ID of the cargo tag by the scanner. In another embodiment, the terminal further comprises an input interface for receiving the command.

In the embodiment, in order to provide cargo retrieval record, the processing module is further configured for having a printer to print a retrieval record after the pairing relationship is deleted.

According to one embodiment of the present invention, a cargo tag of a cargo management system is provided. The cargo tag comprises a memory; a wireless interface, configured for wirelessly connecting to a terminal; a speaker, configured for emitting audible signal; a visual indicator, configured for emitting visual signal; and a processing module, coupled to the memory, the wireless interface, the speaker and the visual indicator, configured for executing instructions stored in the memory to implement following steps: receiving a paging message from a terminal via the wireless interface; and during a time period after the paging message is received, having the speaker to emit a first audible signal and the visual indicator to emit a first visual signal to prompt a user.

In the embodiment, in order to connect with a cargo, the cargo tag further comprises a body to contain the memory, the wireless interface, the speaker, the visual indicator and the processing module; and a mechanical apparatus, attached to the body, configured for connect with a cargo.

In the embodiment, in order to provide a health cargo tag, the processing module is further configured for: receiving a self-test message from the terminal via the wireless interface; performing self-test; and if the self-test is successful, transmitting a test success message to the terminal via the wireless interface. In one embodiment, the processing module is further configured for: in response to the self-test is successful, having the speaker to emit a second audible signal and the visual indicator to emit a second visual signal to prompt a user that the self-test is successful. In on embodiment, the processing module is further configured for: in response the self-test is failed, transmitting a test fail message to the terminal; and having the speaker to emit a third audible signal and the visual indicator to emit a third visual signal to prompt a user that the self-test is failed.

In the embodiment, in order to provide battery power information of the cargo tag, the cargo tag further comprises a battery power sensor. The processing module is further configured for: receiving a battery power test message from the terminal via the wireless interface; measuring, by the battery power sensor, power remained in a battery which supplies power to the cargo tag; and if the remained power is lower than a threshold, having the speaker to emit an audible signal and the visual indicator to emit a visual signal to prompt a user that the battery power is insufficient. In one embodiment, the processing module is further configured for transmitting a power insufficient warning message to the terminal via the wireless interface.

In the embodiment, in order to provide battery power information of the cargo tag, the cargo tag further comprises a battery power sensor. The processing module is further configured for: receiving a battery power test message from the terminal via the wireless interface; measuring, by the battery power sensor, power remained in a battery which supplies power to the cargo tag; and if the remained power is lower than a threshold, having the speaker to emit an audible signal and the visual indicator to emit a visual signal to prompt an user that the battery power is insufficient. In one embodiment, the processing module is further configured for transmitting a power insufficient warning message to the terminal via the wireless interface.

According to one embodiment of the present invention, a cargo management system comprising the aforementioned cargo tag and the terminal is provided.

According to one embodiment of the present invention, a processing method of a terminal of a cargo management system is provided. The processing method comprises: scanning, by a scanner of the terminal, an ID shown on a cargo tag; scanning, by the scanner, an identity corresponding to a cargo; and storing a pairing relationship of the ID of the cargo tag and the identity of the cargo in a memory of the terminal.

In the embodiment, in order to provide a receipt to the cargo provider, the processing method further comprises: having a printer to print a receipt after the storing step, the receipt shows at least one of followings: the ID of the cargo tag; and the identity of the cargo. In one example, in order to let the user moves around, the terminal further comprises a standard wireless interface for connecting to the printer. In another example, in order to prevent failure of the standard wireless interface, the terminal further comprises the printer.

In the embodiment, in order to provide health cargo tag, the processing method further comprises: transmitting a self-test message to the cargo via a wireless interface of the terminal after the ID shown on the cargo tag is scanned; and the storing step is performed in response to receiving a test success message from the cargo tag via the wireless interface.

In the embodiment, in order to discover cargo tags with insufficient battery power, the processing method further comprises broadcasting a battery power test message to all cargo tags via a wireless interface of the terminal. The cargo tag receives the battery power test message perform a battery power measurement. If the remained power is insufficient, the cargo tag would have a speaker to emit an audible signal and a visual indicator to emit a visual signal to prompt a user that the cargo tag has insufficient power remained in the battery.

According to an embodiment of the present invention, a processing method of a cargo management system is provided. The processing method comprises: receiving an identity by a terminal; finding a pairing relationship comprising the received identity among a plurality of pairing relationships stored in a memory of the terminal; after the pairing relationship is found, transmitting a paging message to a cargo tag recorded in the pairing relationship via a wireless interface of the terminal; and after the transmitting the paging message, receiving a command to delete the pairing relationship in the memory of the terminal.

In the embodiment, in order to provide convenience to a retriever who retrieves a cargo, the processing method further comprises: scanning the identity by a scanner of the terminal. In one embodiment, the identity is one of followings: the ID of the cargo tag; and the identity of the cargo.

In the embodiment, in order to provide convenience to a retriever who retrieves a cargo, the processing method further comprises: receiving the identity via an input interface of the terminal. In one embodiment, the identity is one of followings: the ID of the cargo tag; and the identity of the cargo.

In the embodiment, in order to conveniently delete the pairing relationship, the processing method further comprises: scanning the ID shown on the cargo tag by a scanner of the terminal as a command to delete the pairing relationship. In another embodiment, the processing method further comprises receiving the command to delete the pairing relationship via an input interface of the terminal.

In order to provide a retrieval record, the processing method further comprises: after the pairing relationship is deleted, having a printer to print a retrieval record.

According to one embodiment of the present invention, a processing method of a cargo tag of a cargo management system is provided. The processing method comprises: receiving a paging message from a terminal via a wireless interface of the cargo tag; and during a time period after the paging message is received, having a speaker of the cargo tag to emit a first audible signal and a visual indicator of the cargo tag to emit a first visual signal to a user to prompt the user.

In the embodiment, in order to provide health cargo tag, the processing method further comprises: receiving a self-test message from the terminal via a wireless interface of the cargo tag; performing self-test by the cargo tag; and if the self-test is successful, transmitting a test successful message to the terminal via the wireless interface of the cargo tag. In one embodiment, the processing method further comprises: if the self-test is successful, having the speaker of the cargo tag to emit a second audible signal and the visual indicator of the cargo tag to emit a second visual signal to a user to prompt the user that the self-test is successful. In one embodiment, the processing method further comprises: if the self-test is failed, having the speaker of the cargo tag to emit a third audible signal and the visual indicator of the cargo tag to emit a third visual signal to a user to prompt the user that the self-test is failed.

In the embodiment, in order to provide information relevant to the cargo or the cargo tag, the processing method further comprises: measuring a sensing value by a sensor of the cargo tag; and if the sensing value exceeds a threshold, transmitting a warning message to the terminal via a wireless interface of the cargo tag. In one example, the sensor includes one of following: a battery power sensor; a temperature sensor; an accelerometer; a gyro, and a pressure sensor. In another example, the processing method further comprises storing multiple of the sensing values sensed by the sensor in a memory of the cargo tag.

In the embodiment, in order to provide remained power information of the cargo tag, the processing method further comprises: receiving a battery power test message from the terminal via a wireless interface of the cargo tag; measuring, by a battery power sensor, power remained in a battery which supplies power to the cargo tag; and if the remained power is lower than a threshold, having the speaker to emit an audible signal and the visual indicator to emit a visual signal to prompt a user that the battery power is insufficient.

The cargo management system provided by the present invention can be used to dynamically pair a cargo and a cargo tag without inputting cumbersome information such as product number and warehousing position and no deployed information infrastructure are required. Hence, the system can be deployed quickly. It helps a user learn where the cargo is in a short time period. Thus, the time required for cargo retrieval is shortened and the service efficiency is improved.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A processing method of a cargo management system, comprising:
   receiving an identity by a terminal;
   finding a pairing relationship comprising the received identity among a plurality of pairing relationships stored in a memory of the terminal, wherein each of the pairing relationships comprises an identity of a cargo and an ID of a cargo tag;
   after the pairing relationship is found, transmitting a paging message to the cargo tag recorded in the pairing relationship via a wireless interface of the terminal;
   after the transmitting the paging message, receiving a command to delete the pairing relationship in the memory of the terminal;
   measuring a sensing value of an environmental parameter exterior to the cargo tag by a sensor of the cargo tag; and
   if the sensing value exceeds a threshold, transmitting a warning message to the terminal via a wireless interface of the cargo tag.

2. The processing method of claim 1, further comprises:
   receiving a self-test message from the terminal via the wireless interface of the cargo tag;
   performing a self-test by the cargo tag; and
   if the self-test is successful, transmitting a test successful message to the terminal via the wireless interface of the cargo tag.

3. The processing method of claim 1, further comprises:
   receiving a battery power test message from the terminal via the wireless interface of the cargo tag;
   measuring, by a battery power sensor, power remained in a battery which supplies power to the cargo tag; and
   if the remained power is lower than a threshold, having a speaker of the cargo tag to emit an audible signal and a visual indicator to emit a visual signal of the cargo tag to prompt a user that the battery power is insufficient.

4. The processing method of claim 1, further comprises:
   receiving the paging message from the terminal via the wireless interface of the cargo tag; and
   during a time period after the paging message is received, having a speaker of the cargo tag to emit a first audible signal and a visual indicator of the cargo tag to emit a first visual signal to prompt a user.

* * * * *